May 10, 1927.
R. MARTIN
1,627,796
MACHINE FOR COLLECTING BUGS
Filed May 8, 1926   2 Sheets-Sheet 1
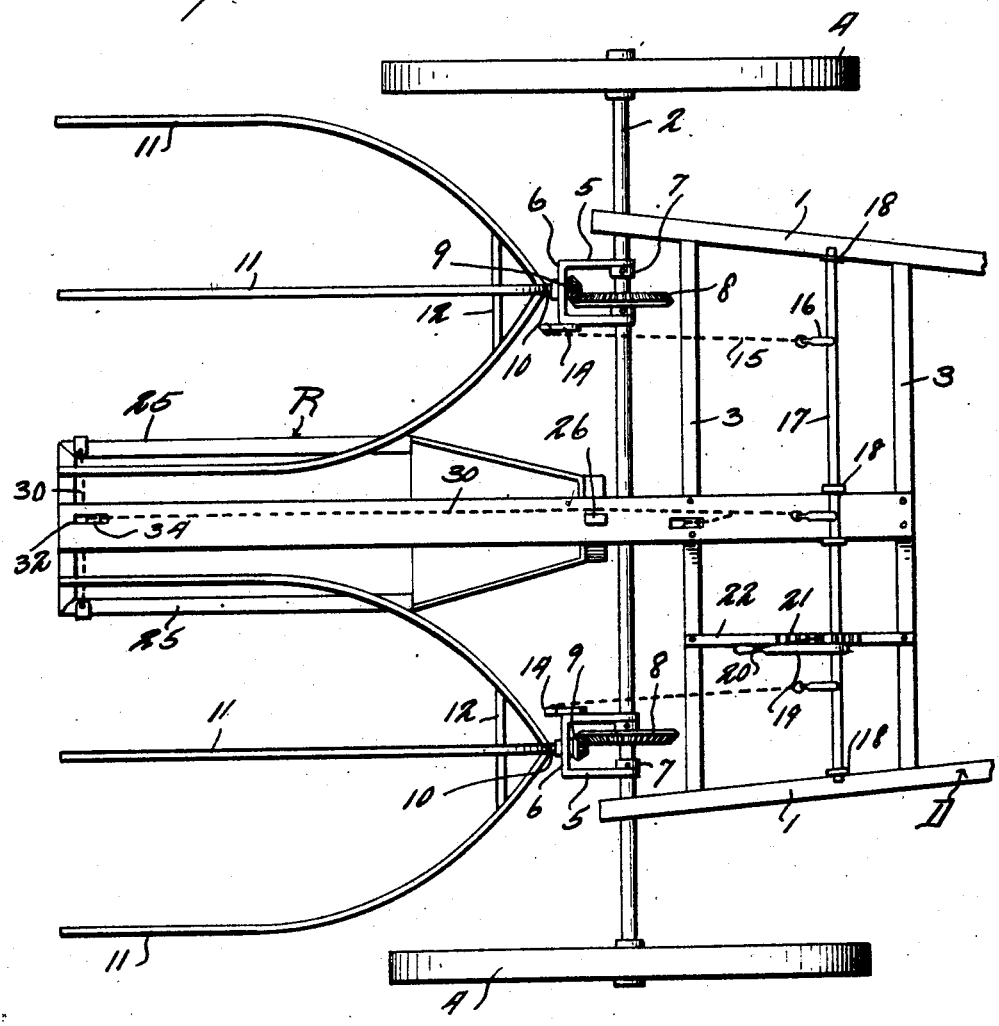
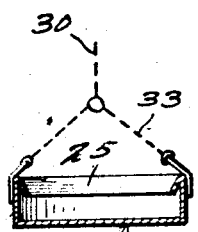
Inventor
R. Martin
By Watson E. Coleman
Attorney May 10, 1927.  
R. MARTIN  
1,627,796  
MACHINE FOR COLLECTING BUGS  
Filed May 8, 1926  
2 Sheets-Sheet 2
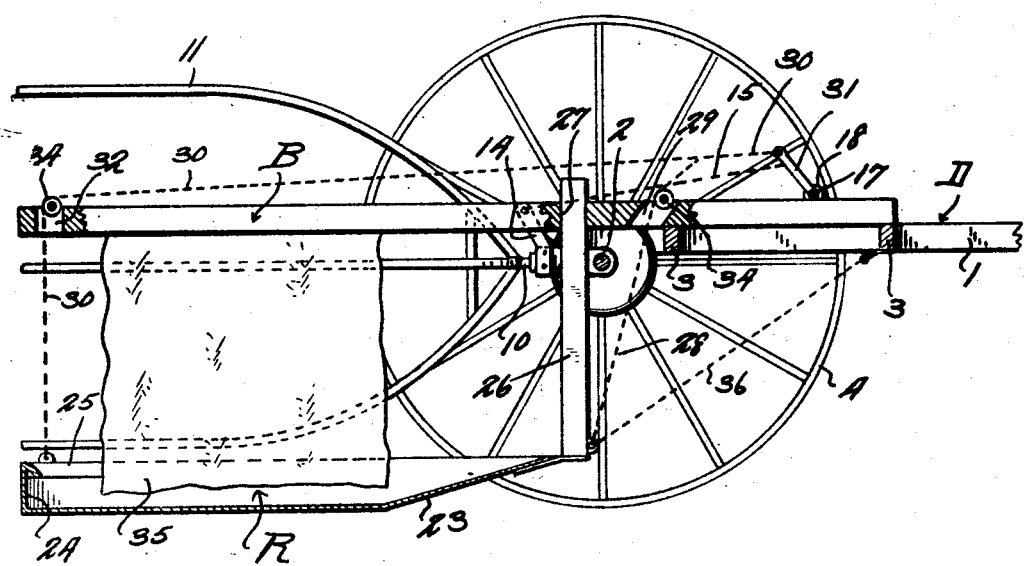
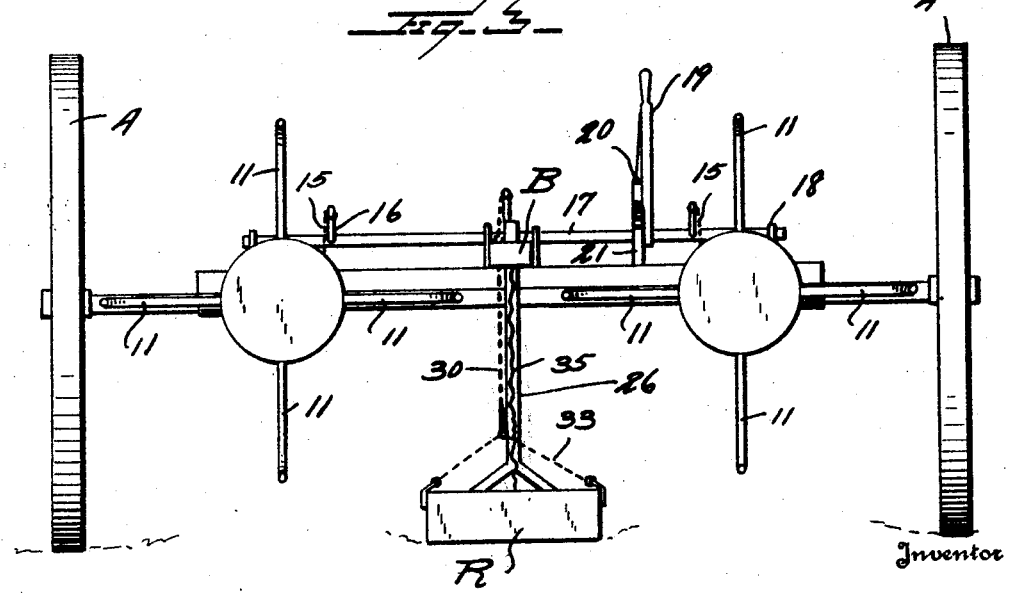
Inventor  
R. Martin  
By Watson E. Coleman  
Attorney Patented May 10, 1927.

1,627,796

UNITED STATES PATENT OFFICE.

ROBERT MARTIN, OF FORT FRANCIS, ONTARIO, CANADA.

MACHINE FOR COLLECTING BUGS.

Application filed May 8, 1926. Serial No. 107,748.

This invention relates to a machine for collecting bugs and it is an object of the invention to provide a machine of this kind comprising a receptacle adapted to travel alongside of a plant row or between adjacent plant rows and adapted to receive bugs dislodged from the plants.

Another object of the invention is to provide a machine of this kind comprising means operating when the machine is in transit for agitating plants to dislodge the bugs thereon together with a receptacle movable with the machine to receive or collect the bugs as dislodged.

It is also an object of the invention to provide a machine of this kind comprising a substantially horizontally disposed agitating medium for engagement with the plants to dislodge bugs therefrom together with a receptacle movable with the machine to receive or collect the bugs as dislodged and wherein means is provided for vertically adjusting the agitating means and the receptacle to compensate for the varying heights of plants, such adjustment being effected at the will of the operator.

The invention consists in the details of construction and in the combination and arrangement of the several parts of my improved machine for collecting bugs whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a machine constructed in accordance with an embodiment of my invention;

Figure 2 is a longitudinal vertical sectional view taken through the structure as illustrated in Figure 1;

Figure 3 is a view in rear elevation of the machine as illustrated in Figure 1;

Figure 4 is a transverse sectional view taken through the receptacle and looking toward the rear.

As disclosed in the accompanying drawings, D denotes a draft rigging including the thills 1 operatively connected with the wheel axle 2. The inner portions of the thills 1 are connected by the transverse members or bars 3 spaced apart as desired and in parallel relation.

The extremities of the axle 2 have fixed thereto the ground wheels 4 whereby, when the machine is in transit, the axle 2 is caused to rotate.

At each side of its longitudinal center and preferably at a point closely adjacent to but inwardly of a thill 1 is freely engaged the free end portions of the side arms 5 of a substantially U-shaped bracket 6. Fixed to the axle 2 inwardly of the side arms 5 and in contact therewith are the collars 7 whereby the bracket 6 is effectively maintained in desired position upon the axle 2.

Fixed to rotate with the axle 2 is a gear 8 arranged between the side arms 5 of each of the brackets 6 and which meshes with a pinion 9 carried by the inner end portion of a stub shaft 10 disposed through and rotatably supported by the intermediate portion of the bracket 6. Secured in any manner desired to the outer end portion of the shaft 10 are the elongated arms 11 herein disclosed as four in number and equidistantly spaced with respect to the axis of the shaft 10. The inner or connected end portions of the arms 11 are disposed on an inward curvature while the outer portions thereof are substantially in parallelism with each other and with the axis of the shaft 10. These arms 11 are of desired length and as they are caused to rotate, when the machine is in transit, are adapted to strike the plants with a force sufficient to dislodge bugs without injuring the plants. It is also to be understood that each set of arms 11 are caused to rotate inwardly and upwardly so that the bugs as dislodged from the plants will be thrown between adjacent plant rows.

In practice, my improved machine as herein set forth is adapted to be employed in connection with two adjacent rows with a receptacle R, to be hereinafter more particularly referred to, traveling in the valley between the adjacent rows and which receives or collects the bugs dislodged from the plants.

The inner extremities of the curved portions of each set of arms 11 has interposed therebetween and suitably attached thereto a bracing or reinforcing head or disc 12.

Each of the brackets 6 has extending upwardly therefrom an arm 14 to the free end portion of which is secured a flexible member 15 which in turn is secured to an upstanding rock arm 16 carried by a shaft 17. This shaft 17 is disposed transversely of the draft rigging D and preferably between the bars or members 3 and rotatably supported by the bearings 18. This shaft 17 also has fixed thereto an upstanding lever 19 provided with a conventional latch mechanism 20 coacting with the arcuate rack 21. This rack 21 is carried by a bar 22 connecting the bars 3 and is preferably arranged to one side of the longitudinal center of the bars 3. By proper manipulation of the lever 19 the brackets 6 may be raised or lowered to effect a vertical adjustment of the bars or elongated arms 11 as the varying heights of the plants being worked may necessitate.

Secured to the central portion of the bars 3 is the forward end portion of a beam B. This beam B extends rearwardly of the axle 2 for a material distance and provides a supporting medium for the receptacle R hereinbefore referred to. The receptacle R is of desired length and preferably shallow having its forward portion 23 disposed on an upward incline or more particularly the bottom thereof, while the side flanges 24 have their upper margins defined by the downwardly disposed and inwardly inclined flanges 25. These flanges 25 serve effectually to prevent the bugs collected or received within the receptacle R from escaping over the side flanges 24. The flanges 25 especially in view of the vibration of the receptacle R in transit constitute an effective shield against such escape.

The forward portion of the receptacle R at its transverse center is provided with an upstanding rigid post 26 which is slidably disposed through an opening 27 provided in the beam B at a point in relatively close proximity to the axle 2. While this post 26 will permit the desired raising and lowering of the receptacle R yet it effectually serves to prevent the receptacle R against undue transverse displacement when the machine is in transit. Also secured to the forward portion of the receptacle R is a flexible member 28 which extends upwardly through a second opening 29 in the beam B and is operatively connected by the flexible member 30 with the upstanding rock arm 31 also carried by the shaft 17. This member 30 extends rearwardly along the beam B and down through the opening 32 and operatively connected by the branch members 33 with the rear portion of the receptacle R.

As the shaft 17 is rocked in a direction to raise the bars 11, the flexible members 28 and 30 will also operate to raise the receptacle R so that it will be assured at all times that the receptacle R is in proper position with respect to the arms 11.

The flexible members 28 and 30 are disposed over suitably positioned guide rollers 34.

I also find it of advantage to depend from that portion of the beam B above the receptacle R a flexible apron or curtain 35. This apron provides means whereby the bugs thrown from one row of plants will be prevented from passing entirely across the receptacle R and thus assure the proper collection of the bugs. This apron or curtain 35 is adapted to extend along the major portion of the receptacle R.

Also secured to the forward portion of the receptacle R is a draft chain 36 which, as herein disclosed, is secured to the central portion of the forward bar 3. This draft member 36, preferably a chain, assures the desired travel of the receptacle R with the machine when in transit.

The machine herein disclosed is particularly adapted for use in connection with potato vines although it is to be understood that I do not limit myself to this particular use.

From the foregoing description it is thought to be obvious that a machine for collecting bugs constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A machine of the class described comprising, in combination, a wheel supported axle, a bracket engaged with the axle for swinging movement about the axle, a revoluble striking element carried by the bracket and disposed rearwardly of the machine, said axle rotating when the machine is in transit, a driving connection between the axle and revoluble element, means for swinging the bracket to raise the element, a frame structure operatively engaged with the axle, a rearwardly disposed beam carried by said frame structure and extending along one side of the revoluble element, a receptacle positioned below the beam, flexible members coacting with the beam and receptacle for supporting said receptacle, the means for swinging the bracket also imposing pull upon said flexible members when the bracket moves upwardly to lift the receptacle.

2. A machine of the class described comprising, in combination, a wheel supported axle, a bracket engaged with the axle for swinging movement about the axles, a revoluble striking element carried by the bracket and disposed rearwardly of the machine, said axle rotating when the machine is in transit, a driving connection between the axle and revoluble element, means for swinging the bracket to raise the element, a frame structure operatively engaged with the axle, a rearwardly disposed beam carried by said frame structure and extending along one side of the revoluble element, a receptacle positioned below the beam, flexible members coacting with the beam and receptacle for supporting said receptacle, the means for swinging the bracket also imposing pull upon said flexible members when the bracket moves upwardly to lift the receptacle, and a stabilizing member coacting with the receptacle and beam to hold the receptacle against undue lateral movement.

3. A machine of the class described comprising, in combination, a wheel supported axle, a bracket engaged with the axle for swinging movement about the axle, a revoluble striking element carried by the bracket and disposed rearwardly of the machine, said axle rotating when the machine is in transit, a driving connection between the axle and revoluble element, means for swinging the bracket to raise the element, a frame structure operatively engaged with the axle, a rearwardly disposed beam carried by said frame structure and extending along one side of the revoluble element, a receptacle positioned below the beam, flexible members coacting with the beam and receptacle for supporting said receptacle, the means for swinging the bracket also imposing pull upon said flexible members when the bracket moves upwardly to lift the receptacle, and an upstanding rigid member carried by the receptacle, said beam having an opening through which said upstanding member is slidably disposed.

In testimony whereof I hereunto affix my signature.

ROBERT MARTIN.